United States Patent [19]

Andrews

[11] Patent Number: 5,099,226

[45] Date of Patent: Mar. 24, 1992

[54] INTELLIGENT SECURITY SYSTEM

[75] Inventor: George F. Andrews, Cocoa, Fla.

[73] Assignee: Interamerican Industrial Company, Miami, Fla.

[21] Appl. No.: 643,455

[22] Filed: Jan. 18, 1991

[51] Int. Cl.$^5$ ............................................. G08B 13/14
[52] U.S. Cl. ................................... 340/572; 340/505; 340/541; 340/551; 340/693; 340/825.69
[58] Field of Search ............... 340/572, 551, 676, 567, 340/555, 541, 825.34, 825.44, 825.69, 505, 825.54, 693; 342/42, 44; 235/435

[56] References Cited

U.S. PATENT DOCUMENTS

| | | | |
|---|---|---|---|
| 3,832,530 | 8/1974 | Reitboeck et al. | 340/572 X |
| 4,068,232 | 1/1978 | Meyers et al. | 342/44 |
| 4,207,468 | 6/1980 | Wilson | 250/341 |
| 4,242,663 | 12/1980 | Slobodin | 342/44 X |
| 4,260,983 | 4/1981 | Falck et al. | 340/572 |
| 4,475,481 | 10/1984 | Carroll | 119/51.02 |
| 4,656,463 | 4/1987 | Anders et al. | 340/572 |
| 4,663,625 | 5/1987 | Yewen | 340/825.54 |
| 4,673,932 | 6/1987 | Ekchian et al. | 340/825.54 |
| 4,688,026 | 8/1987 | Scribner et al. | 340/572 |
| 4,730,188 | 3/1988 | Milheiser | 340/825.69 X |
| 4,742,470 | 5/1988 | Juengel | 340/825.54 X |
| 4,857,893 | 8/1989 | Carroll | 340/572 |
| 4,862,160 | 8/1989 | Ekchian et al. | 340/825.54 |
| 4,931,788 | 6/1990 | Creswick | 340/825.54 |
| 4,963,887 | 10/1990 | Kawashima et al. | 342/44 |

*Primary Examiner*—Glen R. Swann, III
*Assistant Examiner*—Thomas J. Mullen, Jr.
*Attorney, Agent, or Firm*—Pettis & McDonald

[57] ABSTRACT

An intelligent security system capable of sensing the presence of an object to be identified, interrogating the object with an encrypted code, and receiving and processing an encoded response from a passive transceiver carried by the object so that the intelligent security system can be utilized for controlling access to a location, performing inventory control, controlling toll access systems, operating multi-station complex machinery systems, or providing object locating information, for example. The intelligent security system is particularly characterized by its utilization of a totally passive transceiver including a transmit circuit which will only be activated upon receipt by the transceiver of a predetermined encrypted interrogation signal. In response to receipt of a proper interrogation signal, an encoded response signal is transmitted by the passive transceiver and then received, decoded and processed by other elements of the security system.

11 Claims, 1 Drawing Sheet

INTELLIGENT SECURITY SYSTEM

BACKGROUND OF THE INVENTION

1. Field of the Invention

The present invention relates to an intelligent security system including a truly passive transceiver means which may be attached to virtually any object so that the intelligent security system may be utilized to identify and process information concerning the particular object to which the passive transceiver is attached. Power to operate the passive transceiver is derived from electromagnetic radiation, preferably in the form of encrypted radio frequency energy, which is transmitted by a scanner which is one element of the security system. The passive transceiver includes circuitry capable of both rectifying and decoding the encrypted radio frequency power. If a predetermined radio frequency message is received by the passive transceiver, its transmit circuitry will then be energized to provide an encoded response. The encoded response is received by the scanner means and provided to a decoder, and that decoded response is then fed to a central processing unit for operation of the security system in accord with pre-programmed instructions.

Throughout the specification and claims of this patent, it is to be understood that the term "passive" is meant to indicate operability without connection to an external power source and also without the necessity for any internal power source such as a battery.

2. Description of the Prior Art

The prior art discloses and teaches numerous devices which are useful for providing locator information and/or access to controlled spaces by the use of a passive card or tag. For example, virtually all automatic teller machines require the insertion of a magnetically-encoded card for proper operation of that machine. Similar, magnetically-encoded devices are frequently used as key cards to provide access to controlled spaces or as fee cards for toll booths or vending machines. However, utilization of such magnetically-encoded cards invariably requires that the card be properly inserted into the device to be actuated so that the code embedded therein may be read.

Prior patent literature teaches another form of passive security tags which are energized by electromagnetic radiation from a remote source. One such device is disclosed in U.S. Pat. No. 4,857,893 to Carroll. According to the disclosure of that patent, a transponder device receives a carrier signal from an interrogator unit. Circuitry within the transponder device rectifies the carrier signal to generate operating power, and logic circuits within the transponder device then respond by broadcasting a reply data word which is received and processed by the interrogator unit which provided the initial carrier signal. The disclosure of this Carroll patent is particularly pertinent, for the transponder device is constructed by providing all electrical circuits on a single monolithic semiconductor chip. However, it must be noted that the output from the Carroll transponder device is a submultiple of the input, or carrier, frequency, and there is no real security with regard to that incoming frequency. A predetermined frequency will trigger any corresponding transponder device by which it is received.

U.S. Pat. No. 4,688,026 to Scribner, et al., discloses a method for collecting and using data associated with tagged objects wherein radio frequency energy is used to activate tags capable of wirelessly transmitting unique codes. However, according to the disclosure of this Scribner patent, there is no encryption of the interrogating signal so that any tag capable of receiving the broadcast interrogation frequency will be activated to respond.

Yet another device utilizing what are referred to as "passive transceivers" for the purpose of monitoring location, identification, movement, or inventory of items is disclosed in U.S. Pat. No. 4,656,463 to Anders, et al. However, notwithstanding that patent's use of the word "passive," the disclosure of this patent is quite clear that its "passive transceiver" is actually battery-powered.

Still another identification system, which does utilize a passive transponder, is taught in U.S. Pat. No. 4,730,188, to Milheiser. As with other similar prior art devices, the Milheiser system includes a passive integrated transponder attached to or embedded in an item to be identified which is actuated by an inductive coupling from an interrogator. Upon actuation, the passive integrated transponder responds to the integrator via the inductive coupling with a signal consisting of a stream of data unique to that particular item. However, also as with the similar prior art devices, the Milheiser system does not disclose or teach an encrypted interrogation signal which is firs decoded by the passive integrated transponder before its transmit circuit may be actuated to provide data.

U.S. Pat. No. 4,260,983 to Falck, et al., discloses a presence sensing detector and a system for detecting an article by virtue of a receiver/transmitter affixed to that article. However, according to the disclosure of this patent, the detector is always transmitting its interrogation signal, and as with the other devices identified above, there is not security code, or encryption, associated with the incoming signal.

Two prior art inventory data acquisition systems are represented by U.S. Pat. No. 4,673,932 and U.S. Pat. No. 4,862,160, both to Ekchian, et al. According to the disclosures of those patents, a computerized transceiver repeatedly sweeps through a set of transmit/receive frequencies to interrogate collectively a plurality of items. Items in each group are tagged with a printed circuit transponder tuned to frequencies uniquely assigned to each group. The printed circuit transponders reply to the computerized transceiver for accumulation of inventory control data. However, the replies are frequency coded only, no digital data is transmitted, and, as above, the interrogating signal could only be said to be frequency coded, and not encrypted.

Two other prior art patents have been noted and are deemed pertinent to the general scope of the present invention. U. S. Pat. No. 4,475,481 to Carroll relates to an identification system comprising an intermittent electromagnetic generator at one frequency and a remote receiver for receiving the electromagnetic energy and using it to power an encoder of digital information. Clearly, there is no real security associated with this identification system, for the remote receiver will respond to any incoming signal so long as it is simply of a predetermined frequency. U.S. Pat. No. 4,931,788 to Creswick discloses a transponder for receiving a modulated interrogating signal, means for demodulating the received signal to produce a periodic base band signal, and means for transmitting data at a rate determined by periodicity of that base band signal. As with the other prior art devices noted, there is no incoming security code which must be decoded before the transponder of this invention will respond with its data information.

It is therefore quite clear that there remains a significant need in the art for an intelligent security system utilizing a truly passive transceiver capable of receiving and decoding a incoming interrogation signal before being actuated to generate and transmit unique data information held by the passive transceiver.

SUMMARY OF THE INVENTION

The present invention relates to an intelligent security system comprising scanner means to detect the presence of a predetermined object and to transmit an encrypted interrogation signal upon detecting that object. A passive transceiver means is carried by the object and includes a first circuit for receiving the encrypted interrogation signal, rectifying that signal to provide a source of power for the transceiver, and decoding the interrogation signal. The decoded signal is then provided to second circuit means including logic circuitry to determine whether or not a proper interrogation signal has been received. If so, the second circuit means is then actuated to transmit a predetermined encoded response signal. The encoded response signal is received by a signal decoder means which is operatively connected to the scanner means, and the encoded response signal is decoded. The decoded signal includes data information which is then passed to a central processing unit which is operatively connected to the response signal decoder. Dependent only upon the operational parameters of the central processing unit, the information received from the passive transceiver is appropriately processed.

While the above information summarizes the intelligent security system of this invention, certain features of the system, and especially of the passive transceiver means, are worthy of further comment. As with generally similar prior art devices, the passive transceiver means of this invention is preferably constructed as a single semiconductor chip. By virtue of this construction and its truly passive nature, the passive transceiver means may be quite small and easily embedded in a tag or label affixed to the predetermined object, or it may even be incorporated into the object's structure. In the preferred embodiment, both the encrypted interrogation signal and the encoded response signal are preferably radio frequency energy, so there is never any necessity of any direct physical contact between the scanner means and the passive transceiver means.

Also, of particular note is the construction of the first and second circuits of the passive transceiver means to permit it to decode a truly encrypted interrogation signal and to transmit a new, encoded response signal while maintaining simplicity of circuit design, low cost, and small space requirements. In fact, according to a preferred embodiment of the system of this invention, the encrypted interrogation signal received by the passive transceiver means may be any one of about $2^{256}$ combinations, and the encoded response signal transmitted by the passive transceiver means may be of the same order of complexity. It is clear, then, that the intelligent security system of this invention provides a much more secure system than any of the prior art of which this inventor is aware.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DETAILED DESCRIPTION

Figure 1:
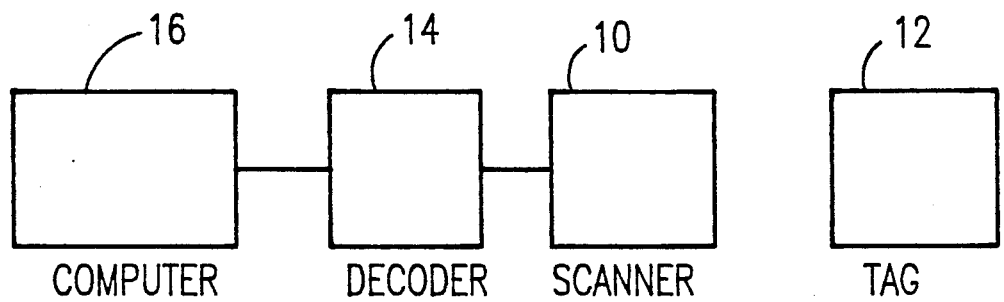
FIG. 1 is a block diagram of a preferred intelligent security system in accord with this invention.

A preferred embodiment for the intelligent security system of this invention is depicted in block diagram form in the view of FIG. 1. As shown in that figure, the system comprises a scanner means 10 to detect the presence of a predetermined object (not shown) and to transmit an encrypted interrogation signal upon so detecting the object. A passive transceiver means shown in this preferred embodiment as tag 12 is carried by the detected object as by any suitable means and comprises first circuit means for receiving the encrypted interrogation signal, for rectifying the interrogation signal to provide a source of power for tag 12 and for decoding the interrogation signal. Tag 12 further includes second circuit means for transmitting a predetermined encoded response signal in response to a predetermined decoded interrogation signal as provided by the first circuit means. Details of a preferred construction for tag 12 are discussed hereinafter and shown in the view of FIG. 2.

The system further comprises a response signal decoder means 14 operatively connected to scanner means 10 to receive and decode the response signal transmitted by tag 12. Finally, a central processing unit, illustrated as computer 16 in the view of FIG. 1, is operatively connected to the decoder 14 to receive and process the decoded response signal. In this preferred embodiment, both the encrypted interrogation signal and the encoded response signal comprise electromagnetic radiation, and are preferably radio frequency signals. Therefore, there is no necessity of any physical contact between scanner 10 and tag 12.

At this point it should be noted that scanner 10 may be of suitable construction to detect the presence of virtually any object so as to cause scanner 10 to transmit its predetermined encrypted interrogation code. For example, scanner 10 may include photoelectric means to detect the presence of any object within a beam of light, resulting in transmission of the encrypted interrogation signal. Such an embodiment for scanner 10 might be used, for example, to monitor the progress of articles along a conveyor belt. Alternatively, scanner 10 may include heat sensing elements to detect the presence of, for example, a person, to actuate transmission of the encrypted interrogation signal and such an embodiment would be appropriate for controlling access to a secure space. Yet another embodiment for scanner 10 might include means for detecting a change in magnetic field to result in transmission of the encrypted interrogation signal. In any event, it is not intended to limit the scope of the present invention to any single means for detecting the presence of an object carrying a tag 12 in order to cause scanner 10 to broadcast its predetermined encrypted interrogation signal.

In similar fashion, the scope of this intelligent security system is not to be limited to any single construction for decoder 14 or computer 16. All that is required is that decoder 14 be operatively connected to scanner 10 so as to receive and decode the response signal from tag 12. Then, decoder 14 is operatively connected to computer 16 so as to provide the decoded signal to computer 16 for final processing. Dependent only upon the program instructions installed within computer 16, it can then utilize the data transmitted from tag 12 in accord with its program instructions. For example, it might then provide access to a secured space. Alternatively, it might make an inventory control entry, or even a retail sales entry in combination with the inventory control entry.

Figure 2:
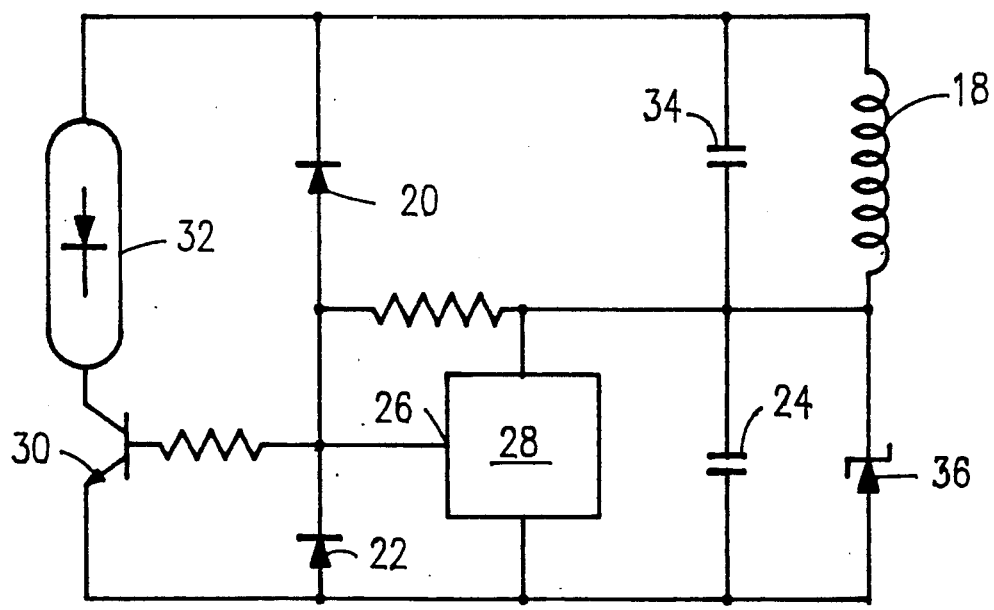
FIG. 2 is a schematic representation of the passive transceiver means of this invention.

We turn then to a consideration of the passive transceiver means of this invention, shown as tag 12 in the view of FIG. 1, and represented schematically in the view of FIG. 2. Once scanner 10 has detected the proximity of an object believed to be carrying the passive transceiver means (tag 12), scanner 10 generates a predetermined radio frequency encrypted interrogation signal. The incoming signal is received by antenna 18 and is rectified by first diode means including diode 20 and diode 22. The rectified radio frequency energy is transmitted to capacitor 24 where it is stored as an energy source for powering other circuit functions. Diode 20 performs the additional function of demodulating the incoming digital data stream received by antenna 18 and applies this demodulated signal to the data pin 26 of logic device 28.

If the demodulated signal received by logic device 28 corresponds to the interrogation code stored therein, then a logic output signal is generated, causing the predetermined stored contents of logic device 28 to be transmitted through data pin 26 to activate radio frequency switch 30. Switch 30 controls a two terminal negative resistance device 32 causing it to generate an encoded radio frequency response signal for transmission back to scanner 10 and decoder 14. The frequency of the encoded response signal is determined by a resonant tank circuit comprising capacitor 34 and antenna 18. It is also to be noted that a zene diode 36 is provided for regulating the stored potential of capacitor 24.

It is, of course, to be understood that logic device 28 is actuated to transmit its stored data only upon receiving a predetermined demodulated interrogation signal from diode 20 of the passive transceiver means first circuit. Then, and only then, is energy taken from capacitor 24 to actuate the passive transceiver means second circuit including switch 30, negative resistance device 32, and the resonant tank circuit. As previously indicated, the logic device 28 in this preferred embodiment is capable of responding to any one of about $2^{256}$ combinations for the encrypted interrogation code, and may transmit an encoded response signal of that same number of combinations.

Because of the construction of the passive transceiver means (tag 12) to decode and respond to only a proper encrypted interrogation signal, the system of this invention is remarkably secure. The likelihood of the passive transceiver means responding to an unauthorized interrogation signal is so small as to be virtually non-existent. Of course, similar security in the form of encoding is provided for the response signal. Also, because the passive transceiver means is preferably integrally formed on a single semiconductor chip, it is extremely small and relatively inexpensive, thereby permitting use of the passive transceiver means of this invention in an extremely wide variety of applications.

It will thus be seen that the objects set forth above, among those made apparent from the preceding description, are efficiently attained, and since certain changes may be made in the above construction without departing from the scope of the invention, it is intended that all matter contained in the above description, or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. An intelligent security system, said system comprising: scanner means to detect the presence of a predetermined object and to transmit an encrypted interrogation signal upon so detecting the object; a passive transceiver means carried by the object, said passive transceiver means comprising first circuit means for receiving said encrypted interrogation signal, rectifying said interrogation signal to provide a source of power for said transceiver means, and decoding said interrogation signal, and second circuit means for transmitting a predetermined encoded response signal in response to a predetermined said decoded interrogation signal; a response signal decoder means operatively connected to said scanner means to receive and decode said response signal; and a central processing unit operatively connected to said response signal decoder means to receive and process said decoded response signal.

2. An intelligent security system as in claim 1 wherein said encrypted interrogation signal and said encoded response signal comprise electromagnetic radiation.

3. An intelligent security system as in claim 1 wherein said encrypted interrogation signal and said encoded response signal comprise radio frequency signals.

4. An intelligent security system as in claim 1 wherein said scanner means, said response signal decoder means, and said central processing unit are operatively connected to an external power source, and wherein said passive transceiver means derives its power from said encrypted interrogation signal.

5. An intelligent security system as in claim 4 wherein said encrypted interrogation signal comprises a first radio frequency signal.

6. An intelligent security system as in claim 5 wherein said encoded response signal comprises a second radio frequency signal.

7. An intelligent security system as in claim 1 wherein said passive transceiver means derives its power solely from said encrypted interrogation signal, and wherein said encrypted interrogation signal and said encoded response signal comprise radio frequency signals.

8. An intelligent security system as in claim 7 wherein said first and second circuit means are integrally formed.

9. An intelligent security system as in claim 8 wherein said first and second circuit means are integrally formed on a single semiconductor chip.

10. An intelligent security system as in claim 9 wherein said first circuit means comprises antenna means for receiving said encrypted interrogation signal, first diode means for rectifying said interrogation signal and first capacitor means operatively connected to said first diode means to receive and store energy from said rectified signal, said first circuit means further comprising logic means for decoding said interrogation signal and, in response to a predetermined said interrogation signal, generating a logic output signal.

11. An intelligent security system as in claim 10 wherein said second circuit means comprises switch means operatively connected to said logic means for receiving said logic output signal and a negative resistance device operatively connected to said switch means to generate said predetermined encoded response signal, said second circuit means further comprising a resonant tank circuit comprising second capacitor means and said antenna means for transmitting said predetermined encoded response signal to said response signal decoder means.

* * * * *